United States Patent
Schoenbeck

(10) Patent No.: US 8,178,189 B2
(45) Date of Patent: May 15, 2012

(54) LAMINATE FOR DIAPER CLOSURE

(75) Inventor: Marcus Schoenbeck, Versmold (DE)

(73) Assignee: Nordenia Technologies GmbH, Gronau (DE)

( * ) Notice: Subject to any disclaimer, the term of this patent is extended or adjusted under 35 U.S.C. 154(b) by 229 days.

(21) Appl. No.: 12/423,050

(22) Filed: Apr. 14, 2009

(65) Prior Publication Data
US 2009/0258183 A1 Oct. 15, 2009

(30) Foreign Application Priority Data
Apr. 15, 2008 (DE) .......... 10 2008 019 030

(51) Int. Cl.
*B32B 5/02* (2006.01)
*B32B 5/04* (2006.01)

(52) U.S. Cl. .......... 428/195.1; 428/196; 428/198; 428/220; 442/328; 442/382; 442/392; 442/398; 442/399

(58) Field of Classification Search .......... 428/195.1, 428/196, 198, 220; 442/398, 399, 382, 392, 442/328
See application file for complete search history.

(56) References Cited

U.S. PATENT DOCUMENTS

| 6,258,308 B1 * | 7/2001 | Brady et al. | 264/210.2 |
| 7,470,340 B2 | 12/2008 | Baldauf | 156/73.1 |
| 7,625,829 B1 * | 12/2009 | Cree et al. | 442/398 |
| 2003/0022582 A1 | 1/2003 | Cree et al. | 442/394 |
| 2008/0051748 A1 * | 2/2008 | Black et al. | 604/385.01 |

FOREIGN PATENT DOCUMENTS
WO WO 2007061486 5/2007

* cited by examiner

*Primary Examiner* — Elizabeth Cole
(74) *Attorney, Agent, or Firm* — Andrew Wilford

(57) ABSTRACT

A laminate usable as a diaper closure has a pair of generally contiguous outer fleece layers having longitudinally extending and parallel outer edges and a core layer of foil of LP or LLP polyethylene extending between the outer layers substantially a full width of the outer layers between the edges. The foil has a thickness between 5 μm and 20 μm. Bonds are provided between the core layer and each of the outer layers. The laminate has regions activated by stretching and in which the laminate is semielastic, and unactivated regions in which the laminate is not stretchy.

11 Claims, 2 Drawing Sheets

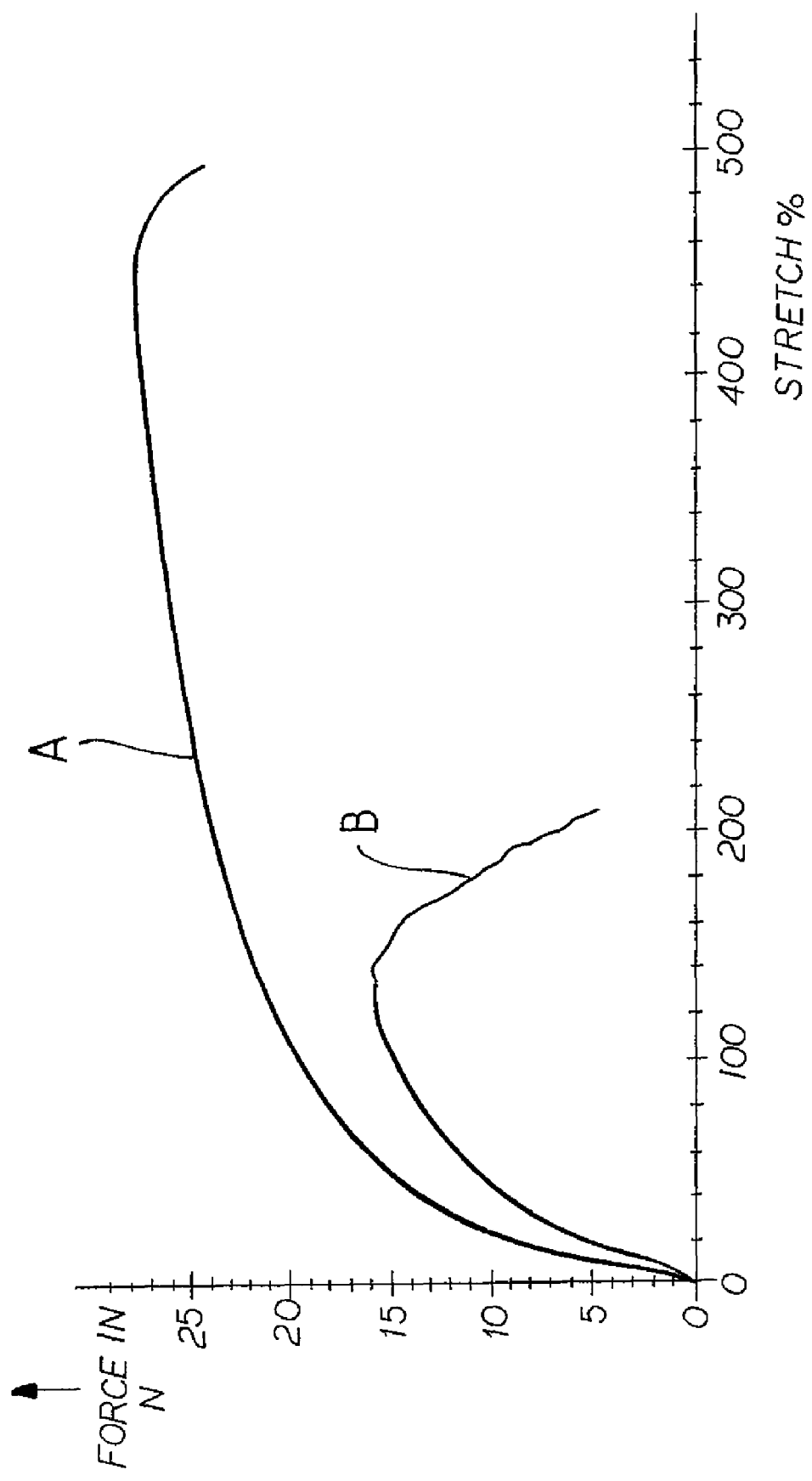

LAMINATE FOR DIAPER CLOSURE

FIELD OF THE INVENTION

The present invention relates to a laminate. More particularly this invention concerns a tape usable as a closure in a disposable diaper and having mixed elastic properties.

BACKGROUND OF THE INVENTION

It is known to use a laminated tape as a stretchable closure for baby diapers, or as elastic sides of a diaper. The laminate has, relative to the direction it travels when being manufactured, transversely spaced strips of high stretchiness or elasticity and semielastic properties alternating with stiff relatively unstretchy strips. The not stretchy regions facilitate attachment after the material has been cut to shape, i.e. prepared into closure elements, for example to hook tapes, to secure the closure tabs of the diaper. For cost-advantageous production of such closure elements, an elongated laminate tape is produced that has longitudinally extending portions that are semielastic alternating with portions that are not stretchy. The closure elements required for diaper production are then cut from the resulting multi-use laminate.

As described in copending patent application Ser. No. 12/413,647 such a tape can be made by feeding in a transport direction a substrate strip having a pair of opposite faces and formed of an elastomer that is highly stretchable longitudinally but only limitedly or not stretchy at all transversely to a gluing station with the longitudinal high-stretch direction of the strip generally perpendicular to the transport direction. A plurality of lines of adhesive extending in the transport direction and generally perpendicular to the high-stretch direction are applied to one of the faces of the substrate strip at the station. Then a soft knit fabric cover strip that is highly stretchable longitudinally but only limitedly or not stretchy at all transversely extending longitudinally is pressed against one or both faces of the substrate strip with the high-stretch direction of the cover strip or strips generally perpendicular to the transport direction to form a laminate. Finally the laminate is cut transversely of the transport direction into individual tapes with the adhesive strips extending transversely of the long dimension of the individual tapes.

Another such laminate is known from U.S. Pat. No. 7,470,340 having outer fleece layers and a layer of an elastomeric foil laminated between the fleece outer layers. The core layer is formed by longitudinally extending and transversely spaced elastomeric foil strips laminated between the outer layers, so that the outer fleece layers are directly connected with one another between the foil strips. At the elastomeric strips, the fleece is transversely stretched. This creates active regions in which the laminate is elastic and very stretchy. In the unactivated regions, the laminate is not stretchy. In this system the core foil strips consist of thermoplastic elastomers, e.g. SBS block copolymers, SIS block copolymers, polyurethanes, or thermoplastic polyolefin elastomers. The above-described polymers are expensive raw materials. Furthermore, feeding and handling elastomer foils in the lamination process is difficult, because elastic monofoils are tacky and elongate in the longitudinal direction as they are fed into and move through the laminater. At high production speeds, the monofoils elongate longitudinally. After the laminate has been bonded together, the elastomeric monofoil relaxes once the web tension is released. This leads to uncontrolled and undesirable wrinkling of the laminate. In order to be able to process the monofoil, additional complicated measures are required, and these have a disadvantageous effect on production costs.

OBJECTS OF THE INVENTION

It is therefore an object of the present invention to provide an improved laminate for use as a diaper closure.

Another object is the provision of such an improved laminate for use as a diaper closure that overcomes the above-given disadvantages, in particular that has a textile surface, a high stretchiness, and semielastic properties and that can be made of inexpensive materials and produced cost-effectively.

SUMMARY OF THE INVENTION

A laminate usable as a diaper closure has according to the invention a pair of generally contiguous outer fleece layers having longitudinally extending and parallel outer edges and a core layer of foil of LD or LLD polyethylene extending between the outer layers substantially a full width of the outer layers between the edges. The foil has a thickness between 5 μm and 20 μm. Bonds are provided between the core layer and each of the outer layers. The laminate has activated stretched regions in which the laminate is semielastic, and unactivated unstretched regions in which the laminate is not stretchy.

The core layer can be a continuous edge-to-edge PE foil or foil strips extending transverse to the finished-tape long dimension, which is parallel to the production direction of the laminate. If the polyethylene foil is laminated in between the outer layers in the form of foil strips, activation is limited to the regions of the foil strips. In the sections that lie between, the outer layers are directly bonded with one another, and form unactivated regions of little or no stretch. If a planar polyethylene foil is laminated full width between the outer layers, the activated regions can be established in any desired manner, in accordance with aspects of application technology. In the unactivated regions, the laminate is not stretchy and can be stretched only by applying great force. Activated regions, in which the laminate can easily be elongated and is semielastric, are formed by local stretching.

The polyethylene foil consists of the types PE-LD and PE-LLD. PE-LD is a branched polyethylene produced using the high-pressure method, having branches of different lengths generally having 8 to 40 long side chains branched in themselves, with reference to 1000 chain links. PE-LLD is a linear polyethylene produced using the low-pressure method and having 100 C4 to C8 groups to the side of the main chain, with reference to 1000 chain links. Mixtures of PE-LD and PE-LLD, which is characterized by great impact resistance, i.e. high elongation to rupture at low tensile strength, are preferred. The defined polyethylene types do not include polyethylenes classified in the group of thermoplastic polyolefin elastomers.

The polyethylene foil stabilizes and strengthens the laminate. Without the polyethylene foil, the fleece would either be too stiff and could not be elongated, or it would tear too easily. The laminate according to the invention is given surprising properties by stretching in the activated regions. For example, in the activated regions, at a high stretchiness, the laminate also demonstrates semielastric properties that result from the interaction of the polyethylene foil and the fleece layers that are laminated to it, and are supported by the stretched fleece of the outer layers.

"Semielastic" means that the laminate can be elongated by a multiple of its original length, in use, and elastically returns to its original with at least 20% elongation after having been stretched.

The polyethylene foil is characterized by a low foil thickness. A foil thickness between 10 µm and 15 µm is preferred.

The semielastric nature of the activated regions of the laminate can be modified by the addition of an elastomer polymer to the polyethylene foil. The elasticity can particularly be improved by the admixture of polyisobutylene with the polyethylene foil containing an admixture of 0.5 to 10 wt.-% polyisobutylene (PIB). Preferably, the proportion of polyisobutylene (PIB) in the polyethylene foil amounts to 0.5 to 5 wt.-%. By an appropriate mixture, the semielasticity of the laminate in the activated regions can be improved in such a manner that the laminate returns to its original length by up to 60% after elongation by 100%. Furthermore, the properties of the polyethylene foil, particularly the impact strength, can be improved by an admixture of ethylene vinyl acetate (EVA), or an ethylene vinyl acetate copolymer (EVAC). The admixture of EVA or EVAC can amount to 5 to 50 wt.-%.

The outer layers of the laminate can consist of a spunbonded or carded fiber fleece. Possible materials for the fleeces are, in particular, polyethylene and also polypropylene, polyamide, or polyethylene terephthalate. The use of carded fiber fleeces as spun-bonded fleeces of different stabilization types is advantageous. These can be thermobonded, for example, or stabilized by water jets. It is practical if the outer layers have a weight/area ratio between 10 g/cm$^2$ and 50 g/cm$^2$, as well as preferably a weight/area ratio between 15 g/cm$^2$ and 30 g/cm$^2$.

The outer layers and the polyethylene foil are preferably glued together by an elastomeric hot-melt glue. Hot-melt glues based on thermoplastic elastomers, for example on the basis of styrene-isoprene-styrene block copolymers (SIS) are particularly suitable. An adhesive application with an application amount between 3 g/m$^2$ to 10 g/m$^2$ is sufficient. Preferably, the adhesive is applied, at least in the activated regions, in the form of adhesive strips that run in the production direction of the laminate and are oriented transversely to the stretching direction of activation. In the unactivated adhesive regions, gluing of the outer layers to one another or to the polyethylene foil can also take place over the entire area.

The laminate has preferably been stretched in a stretching roller assembly in the activated regions. Activation is adjustable by the profile of the stretching rollers, and should be selected in such a manner that, on the one hand, the desired high stretchiness is obtained, and on the other hand, the fleece outer layers are not destroyed too much.

BRIEF DESCRIPTION OF THE DRAWING

The above and other objects, features, and advantages will become more readily apparent from the following description, reference being made to the accompanying drawing in which:

FIG. 3 is a graph illustrating the invention.

SPECIFIC DESCRIPTION

Figure 1:
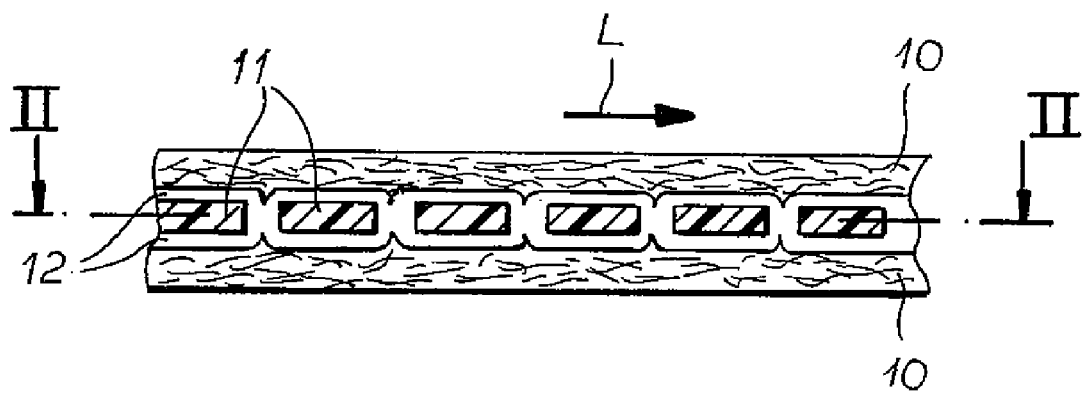
FIG. 1 is a longitudinal section through a laminated tape according to the invention.
Figure 2:
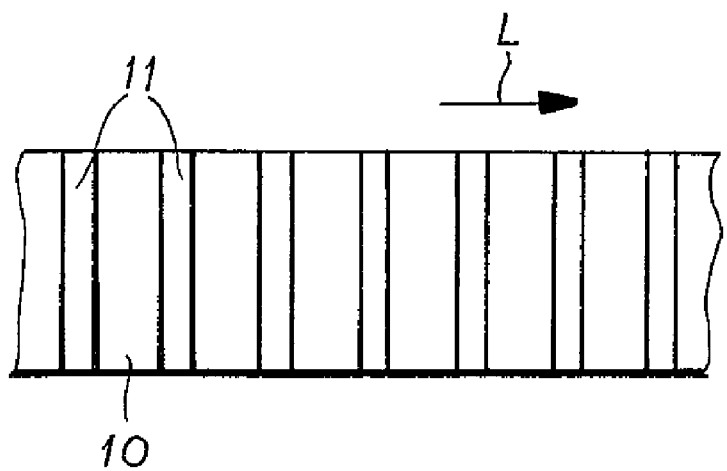
FIG. 2 is a section taken along line II-II of FIG. 1.

As seen in FIGS. 1 and 2 a laminated tape according to the invention comprises a pair of outer layers 10 each formed as a strip extending in a longitudinal direction L. A core layer 11 comprised of a plurality of longitudinally extending but transversely spaced strips is sandwiched between the outer layers 10 and secured thereto by adhesive bonds 12.

More particularly, a polyethylene foil 11 composed of the polyethylene types PE-LD and PE-LLD and a mixture of polyisobutylene (PIB) in accordance with the formula of Table 1 below has been laminated between two outer layers 10 composed of carded fiber fleece. The outer layers 10 each have a weight/area ratio of 27 g/m$^2$, and have been glued to the polyethylene foil by an SIS hot-melt glue 12. The adhesive 12 has been applied at 6 g/m$^2$. The laminate has been stretched in the direction, i.e. transversely to the production direction, by a stretching roller assembly. The elongation of the laminate is shown as Curve A in the elongation diagram shown in FIG. 3.

TABLE 1

| Weight proportion | Polymer | Density in g/cm$^3$ | Melting index in g/10 min at 190° C. and 2.16 kg |
|---|---|---|---|
| 30% | PE-LLD (C4) with 3.4% PIB | 0.919 | 1.3 |
| 40% | PE-LLD | 0.920 | 0.9 |
| 30% | PE-LD | 0.922 | 4.0 |

In a comparison test, two nonwoven layers having a weight/area ratio of 27 g/m$^2$ were glued to one another using an SIS hot-melt glue. The laminate consisting of the two nonwoven layers was subsequently activated in a stretching roller assembly, in the direction, under the same conditions. The elongation behavior of this material is shown as elongation curve B in the figure.

A comparison of Curves A and B makes it clear that the laminate is significantly stabilized and strengthened by the polyethylene foil, and that it is characterized by a high stretchiness. Furthermore, it also demonstrates semielastric properties in the activated region, and is suitable as a material for closure elements on diapers.

After elongation by 100%, the laminate according to the invention returns to its original length by 55%. A residual elongation of 45% remains.

I claim:

1. A laminate usable as a diaper closure, the laminate comprising:
    a pair of generally contiguous outer fleece layers having longitudinally extending and parallel outer edges;
    a core layer of a plurality of longitudinally extending and transversely spaced foil strips consisting of a mixture of LD and LLD polyethylene and 0.5% to 5.0% by weight polyisobutylene extending between the outer layers substantially a full width of the outer layers between the edges, the foil strips having a thickness between 5 µm and 20 µm; and
    bonds of an elastomeric hot-melt glue between the strips forming the core layer and each of the outer layers, the laminate having semielastic regions activated by transverse stretching such that the laminate elastically returns to between 20% and 60% of its original length after elongation of 100%, and unactivated regions in which the laminate is not stretchy.

2. The laminate defined in claim 1 wherein the polyethylene foil strips have a thickness between 10 µm and 15 µm.

3. The laminate defined in claim 1 wherein the outer layers are a spun-bonded or carded fiber fleece.

4. The laminate defined in claim 1 wherein the outer layers have a weight/area ratio between 10 g/cm$^2$ and 50 g/cm$^2$.

5. The laminate defined in claim 4 wherein the weight/area ratio is between 20 g/cm$^2$ and 30 g/cm$^2$.

6. The laminate defined in claim 1 wherein the glue forms a bond in an application amount of 3 to 10 g/m$^2$.

7. The laminate defined in claim 1 wherein the adhesive is in strips that extend longitudinally.

8. A laminate usable as a diaper closure, the laminate comprising:
- a pair of generally contiguous outer fleece layers having longitudinally extending and parallel outer edges;
- a core layer of a continuous edge-to-edge foil consisting of a mixture of LD and LLD polyethylene and 0.5% to 5.0% by weight polyisobutylene extending between the outer layers substantially a full width of the outer layers between the edges, the foil having a thickness between 5 μm and 20 μm; and
- bonds of an elastomeric hot-melt glue between the core layer and each of the outer layers, the laminate having semielastic regions activated by stretching such that the laminate elastically returns to its original length by between 20% and 60% after elongation of 100%, and unactivated regions in which the laminate is not stretchy.

9. The laminate defined in claim 8, wherein the foil has a thickness between 10 μm and 15 μm.

10. The laminate defined in claim 8, wherein the outer layers are a spun-bonded or carded fleece.

11. The laminate defined in claim 8, wherein the adhesive is in strips that extend in a production of the laminate and oriented in a direction in which the web is stretched.

* * * * *